(12) United States Patent
Johnson et al.

(10) Patent No.: US 12,659,437 B2

(45) Date of Patent: Jun. 16, 2026

(54) SYSTEM AND METHOD FOR PROJECTION MAPPING

(71) Applicant: Scalable Display Technologies, Inc., Cambridge, MA (US)

(72) Inventors: Tyler M. Johnson, South Boston, MA (US); Kevin Amaratunga, Belmont, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 875 days.

(21) Appl. No.: 17/971,853

(22) Filed: Oct. 24, 2022

(65) Prior Publication Data

US 2023/0127730 A1 Apr. 27, 2023

Related U.S. Application Data

(60) Provisional application No. 63/272,018, filed on Oct. 26, 2021.

(51) Int. Cl.
H04N 9/31 (2006.01)
G03B 21/14 (2006.01)

(52) U.S. Cl.
CPC ......... H04N 9/3194 (2013.01); H04N 9/3185 (2013.01)

(58) Field of Classification Search
CPC .. H04N 9/3185; H04N 9/3194; H04N 9/3147; G03B 21/14; G03B 21/147
See application file for complete search history.

(56) References Cited

U.S. PATENT DOCUMENTS

| | | |
|---|---|---|
| 5,325,473 A | 6/1994 | Monroe |
| 6,456,339 B1 | 9/2002 | Surati |
| 6,709,116 B1 | 3/2004 | Raskar |

(Continued)

FOREIGN PATENT DOCUMENTS

| | | |
|---|---|---|
| JP | 2012141489 | 7/2012 |
| WO | 2014000159 A1 | 1/2014 |

(Continued)

OTHER PUBLICATIONS

Johnson, Tyler et al. "A Personal Surround Environment: Projective Display with Correction for Display Surface Geometry and Extreme Lens Distortion." 147-154. 10.1109/VR.2007.352475. IEEE Virtual Reality Conference (2007).

(Continued)

*Primary Examiner* — Ryan D Howard

(74) *Attorney, Agent, or Firm* — Loginov & Associates, PLLC; William A. Loginov

(57) ABSTRACT

A system and a process for accurately aligning projection mapping systems using the assistance of camera sensors. The calibration process involves first projecting a modulated gray code image sequence that allows the calibration cameras to identify a dense set of image correspondences between the calibration cameras and the projectors. The calibration cameras are then aligned to the screen surface through the selection of key points or fiducials on the screen surface that are then identified in the camera images. Once the camera(s) are aligned to the screen surface, the image correspondences between the projectors and cameras are used to determine the alignment of the projectors to the screen surface.

20 Claims, 13 Drawing Sheets

(56) References Cited

U.S. PATENT DOCUMENTS

| | | | |
|---|---|---|---|
| 6,729,733 | B1 | 5/2004 | Raskar |
| 6,755,537 | B1 | 6/2004 | Raskar |
| 6,771,272 | B2 | 8/2004 | Deering |
| 6,793,350 | B1 | 9/2004 | Raskar |
| 6,811,264 | B2 | 11/2004 | Raskar |
| 7,119,833 | B2 | 10/2006 | Jaynes |
| 7,182,465 | B2 | 2/2007 | Fuchs |
| 7,306,341 | B2 | 12/2007 | Chang |
| 7,763,836 | B2 | 7/2010 | Webb |
| 8,042,954 | B2 | 10/2011 | Tan |
| 8,262,229 | B2 | 9/2012 | Nelson |
| 8,311,366 | B2 | 11/2012 | Schiewe |
| 8,328,365 | B2 | 12/2012 | Sun |
| 9,049,369 | B2 | 6/2015 | John |
| 9,064,312 | B2 | 6/2015 | Majumder |
| 9,195,121 | B2 | 11/2015 | Sajadi |
| 9,300,901 | B2 | 3/2016 | Grundhofer |
| 9,357,206 | B2 | 5/2016 | Thomas |
| 9,438,897 | B2 | 9/2016 | Barreto |
| 9,503,712 | B2 | 11/2016 | Liang |
| 9,532,018 | B2 | 12/2016 | Ishikawa |
| 9,872,003 | B1 | 1/2018 | Urquhart |
| 10,089,778 | B2 | 10/2018 | Moule |
| 10,091,475 | B2 | 10/2018 | Ishikawa |
| 10,210,607 | B1 | 2/2019 | Weinschenk |
| 10,298,893 | B2 | 5/2019 | Moule |
| 10,523,910 | B2 | 12/2019 | Surati |
| 10,750,141 | B2 | 8/2020 | Boujut-Burgun |
| 2004/0257540 | A1 | 12/2004 | Roy |
| 2007/0291184 | A1 | 12/2007 | Harville |
| 2017/0039756 | A1* | 2/2017 | Moule ..................... G06T 7/521 |
| 2017/0070711 | A1 | 3/2017 | Grundhofer |
| 2017/0200313 | A1 | 7/2017 | Lee |
| 2017/0347079 | A1 | 11/2017 | Wang |
| 2018/0139423 | A1 | 5/2018 | Moule |
| 2018/0164670 | A1 | 6/2018 | Kaji |
| 2018/0176521 | A1 | 6/2018 | Laduke |
| 2018/0376116 | A1 | 12/2018 | Grundhöfer |
| 2019/0246083 | A1 | 8/2019 | Tripathi |
| 2020/0092524 | A1 | 3/2020 | Morris |
| 2020/0193568 | A1 | 6/2020 | Aoyanagi |
| 2020/0211257 | A1 | 7/2020 | Moltaji |
| 2022/0132088 | A1* | 4/2022 | Kurota ................. H04N 9/3194 |

FOREIGN PATENT DOCUMENTS

| | | |
|---|---|---|
| WO | 2015145599 A1 | 10/2015 |
| WO | 2018110774 A1 | 6/2018 |
| WO | 2019096339 A1 | 5/2019 |
| WO | 2019195884 A1 | 10/2019 |

OTHER PUBLICATIONS

Raskar, Ramesh et al. "Shader Lamps: Animating Real Objects With Image-Based Illumination." Rendering Techniques (2001).

Resch, Christoph et al. "Sticky Projections—A New Approach to Interactive Shader Lamp Tracking." Science and Technology Proceedings (2014).

Li, Dong et al. "Multi-projector auto-calibration and placement 15 optimization for non-planar surfaces", Optical Review, Springer Verlag, Tokyo, JP, vol. 22, No. 5, Jul. 21, 2015 (Jul. 21, 2015), pp. 762-778, XP035540467, ISSN: 1340-6000, DOI: 10.1007/S10043-015-0123-4 [retrieved on Jul. 21, 2015].

Raskar, Ramesh et al. "Multi-projector displays using camera-based registration", Visualization '99. Proceedings San Francisco, CA, USA Oct. 24-29, 1999, IEEE, Piscataway, NJ, USA, Oct. 24, 1999 (Oct. 24, 1999), pp. 161-522, XP010364967, DOI: 10.1109/VISUAL. 1999.809883 ISBN: 978-0-7803-5897-3.

* cited by examiner

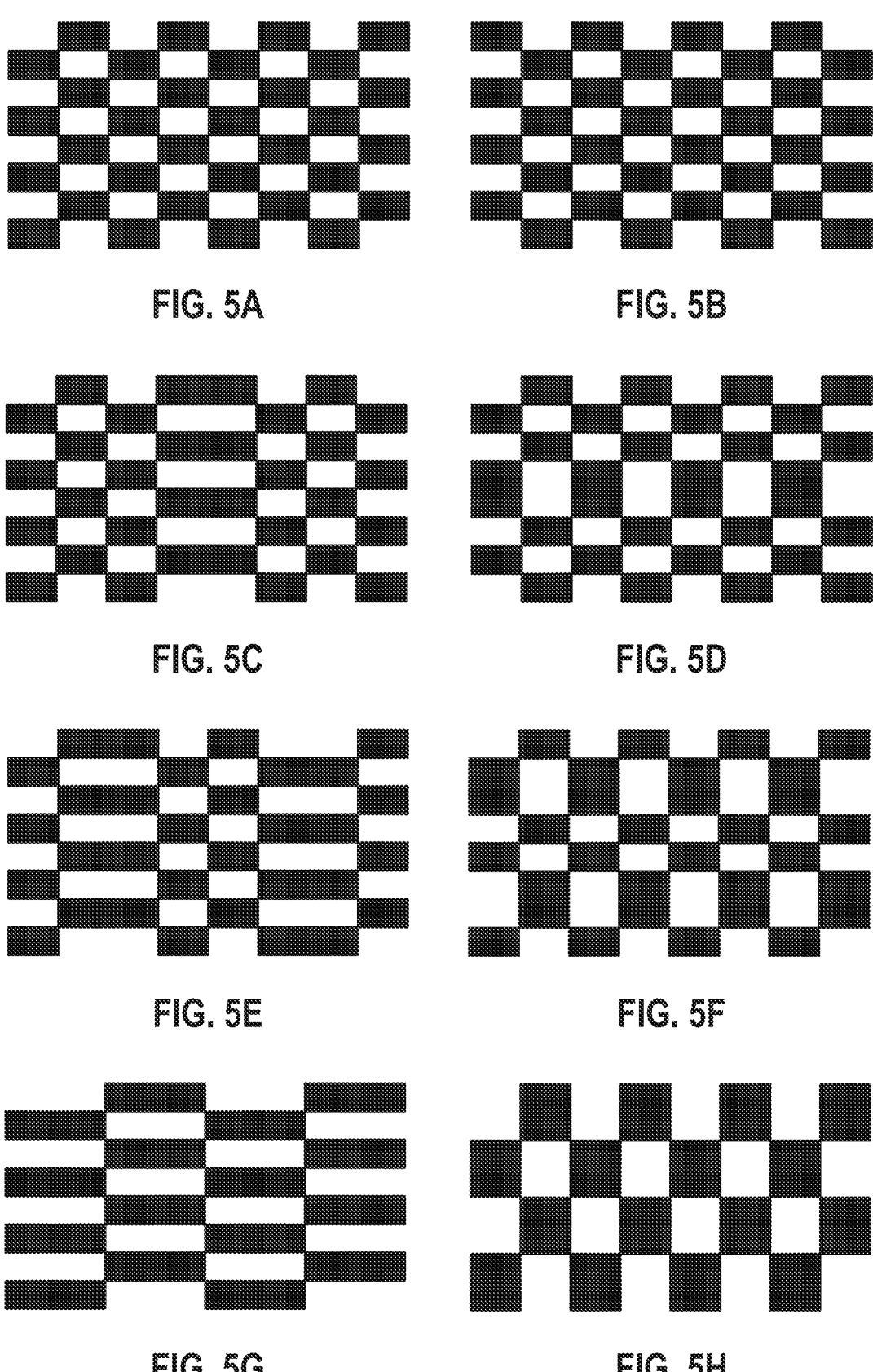
FIG. 5A                           FIG. 5B
FIG. 5C                           FIG. 5D
FIG. 5E                           FIG. 5F
FIG. 5G                           FIG. 5H

SYSTEM AND METHOD FOR PROJECTION MAPPING

RELATED APPLICATION

This application claims the benefit of U.S. Provisional Application Ser. No. 63/272,018, entitled SYSTEM AND METHOD FOR PROJECTION MAPPING, filed Oct. 26, 2021, the teachings of which are expressly incorporated herein by reference.

FIELD OF THE INVENTION

The present invention relates to projection mapping.

BACKGROUND OF THE INVENTION

The field of projection mapping involves using one or more projectors to illuminate an object with light in order to alter its appearance to viewers of the object. This effect is often used in entertainment and marketing to allow a visually textureless object to appear as though textured with visual effects that can be digitally controlled or animated.

Projection mapping presents the challenge of accurately mapping images onto an object with a possibly complex shape. This task is sometimes assisted with the use of camera sensors to create automatic or semi-automatic calibration procedures for projection mapping that may involve projecting coded patterns using the display projectors and detecting these patterns with the cameras in order to accurately determine the location on the object that each projector pixel is illuminating.

When projecting images or patterns onto a complex 3D projection surface with multiple projectors, such projectors are often first calibrated using a conventional two-dimensional gray code image sequence. This approach allows each projector's image to be subdivided into a two-dimensional grid of cells where each cell is assigned a unique numerical identifier to distinguish it from other cells. Each cell's numerical identifier can be expressed in binary as a unique sequence of bits, which in the case of a gray code, are chosen such that the bit sequence of neighboring cells should differ by only a single bit so as to minimize the effects of any pattern detection errors. The gray code is projected as a series of images where each image corresponds to one bit of the gray code sequence. At each pixel in the image, the color is chosen as black or white depending on the gray code bit value of that pixel's enclosing cell. One disadvantage of such an approach is the large block structure of the black and white image sections that are visible especially in the first few images of the sequence, which can create pattern detection difficulties due to indirect light scattering effects. As an example, consider projecting into a room corner where the light on each wall reflects onto the other. In this particular example, the first image of a typical gray code pattern sequence might appear completely white in its left half and completely black in its right half, resulting in one wall having primarily direct illumination and the other having only indirect illumination. This creates a difficult task for the camera to determine which pixels were displayed as black in the projector and which were displayed as white since the indirect illumination level at any point on the screen may differ greatly depending on the content of the individual projected image even though every image may have an equal number of white and black pixels. This change in the indirect illumination level across images in the sequence may cause the pattern detection to confuse a change in indirect illumination levels with a change in image source at that location.

Another challenge posed by projection mapping is to properly blend the images of multiple projectors together in the locations where they overlap on the object. Where multiple projectors overlap, the additive property of light causes these areas to appear brighter than areas that are illuminated by only a single projector. In these overlap areas it is desirable to attenuate the brightness of the projectors so that the combined light contribution is the same level as from a single projector. This attenuation should be in a smoothly varying fashion in the images to create an imperceptible effect. In the case of projection mapping on complex objects, this can be made more complicated by the existence of shadows on the surface where certain surface areas are not visible to some projectors. Any areas of the screen in shadow to one or more projectors will create a difference in intensity of the image since the light contribution from one or more projectors is "missing". These shadow areas may have complex shapes and vary in their spatial area, creating challenges in smoothly blending or attenuating the projector images properly to account for changes in the number of contributing projectors in each area of the screen surface.

SUMMARY OF THE INVENTION

The present application overcomes the disadvantages of the prior art and provides a process for accurately aligning projection mapping systems using the assistance of camera sensors. The calibration process involves first projecting a modulated gray code image sequence that allows the calibration cameras to identify a dense set of image correspondences between the calibration cameras and the projectors. The calibration cameras are then aligned to the screen surface through the selection of key points or fiducials on the screen surface that are then identified in the camera images. Once the camera(s) are aligned to the screen surface, the image correspondences between the projectors and cameras are used to determine the alignment of the projectors to the screen surface.

In order to improve pattern detection reliability in the face of low camera image contrast caused by ambient illumination or indirect light scattering, the structure of each pattern image is modulated by an underlying alternating checker pattern. This serves to break up any large block structures and keep the indirect light scattering more constant across the scene as the patterns change. This image is projected along with its binary complement in order to train the camera at each pixel how bright a full white projector pixel will appear (high value) compared to a black projector pixel (low value).

Finally, the present application provides an approach for smoothly blending the image contributions from all projectors together to remove areas of increased brightness caused by overlapping projectors. The present approach accurately computes the shadow regions on the surface of a complex object using contour maps and combines this information together with the surface orientation at each projector pixel to weight the contribution of all projectors into a combined, blended result.

In an illustrative embodiment, a system and method for projection mapping, for a plurality of projectors, responsive to an image processor arrangement, in which the processor arrangement receiving image data from projected images of each projector of the plurality of projectors is provided. A sequential calibration pattern is projected onto a projection surface. One or more images of the projection surface from at least one pattern of the sequential calibration pattern are projected thereon. A projector to camera transform and a camera to projection surface transform are then computed. A projector to projection surface transform and a frustum for each projector is then determined. Illustratively, the sequential calibration pattern can comprises a modulated gray code sequence, and the modulated gray code sequence can be generated by modulating a predetermined gray code sequence with a first pattern. The one or more images can be captured with at least one camera. The projection surface can comprise a three-dimensional (3D) projection surface. Illustratively, the step of computing the projector to camera transform can comprise, for each pattern of the sequential calibration pattern, determining whether a pixel intensity of displayed cells are the same or opposite as compared to a first pattern, reconstructing a gray code bit sequence at each camera pixel, and classifying each camera pixel to particular cells in the projector. A centroid of each cell can be computed relative to the camera. The camera to projection surface transform can comprise selecting a first plurality of correspondences in a model of the projection surface, and selecting a second plurality of correspondences in an image of the projection surface, wherein the second plurality of correspondences correspond with the first plurality of correspondences. The projector to projection surface transform can be further manually adjusted using a grid-based adjustment tool, so as to provide a fine tuning to the projection mapping. A blend map, can be computed by generating a contour image with each projector onto the surface based upon the frustum for the projector.

In another illustrative embodiment, a system and method of computing a blend map provides a plurality of projectors, responsive to an image processor arrangement, that project, with each projector a predetermined image onto a surface at each of a plurality of predetermined locations thereof, and thereby generates a contour image with each projector onto the surface based upon a known frustum for the projector. Illustratively, the system and method can generate a distance transform image for each projector, a blend weight image for each projector and/or a final blend map for each projector.

In another illustrative embodiment, a system and method for projection mapping for a plurality of projectors, responsive to an image processor arrangement, in which the processor arrangement receiving image data with a camera from projected images of each projector of the plurality of projectors. A projection process, associated with the processing arrangement, is adapted to project a sequential calibration pattern onto a projection surface, at a predetermined image field thereof, with each projector, respectively. The image data can include one or more images, within the predetermined image field, with respect to each projector of each pattern of a plurality of patterns of the sequential calibration pattern. The sequential calibration pattern can comprise a modulated gray code sequence, which is generated by modulating a predetermined gray code sequence with a first pattern. The predetermined gray code sequence can be adapted to maintain a substantially consistent average intensity across the image field in each pattern in the sequence. Illustratively, initial patterns of the gray code sequence can include a first pattern that is a tessellation of light and dark features, and at least one subsequent pattern in the gray code sequence comprises a bifurcated mirror image of the first pattern on each side of each of a vertical bifurcating center line and a horizontal bifurcating center line. The image processor can be constructed and arranged to compute a projector to camera transform and a camera to projection surface transform, and/or can be constructed and arranged to determine a projector to projection surface transform, and determining a frustum for each projector.

BRIEF DESCRIPTION OF THE DRAWINGS

The invention description below refers to the accompanying drawings, of which:

FIGS. 5A-P depict a modulated gray code sequence;

DETAILED DESCRIPTION

I. System Overview

Figure 1:
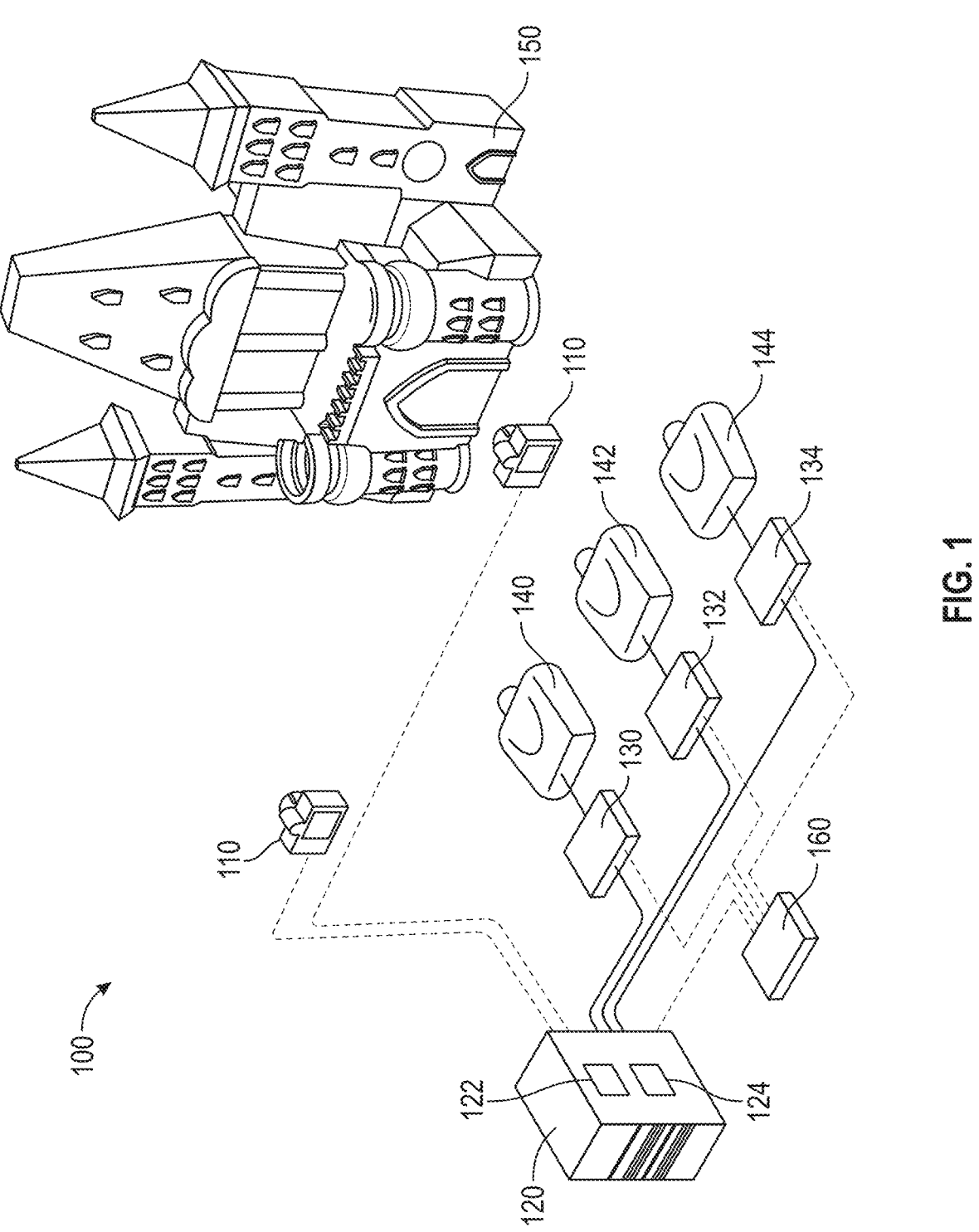
FIG. 1 is a system overview of an exemplary display system employing projection mapping according to one or more aspects of the present disclosure.

FIG. 1 is a system overview of an exemplary display system 100 for projection mapping according to one or more aspects of the present disclosure.

In this example, a computing device 120 may include a processor 122, a memory 124, and any other components typically present in general purpose computers. The memory 124 may store information accessible by the processor 122, such as instructions that may be executed by the processor or data that may be retrieved, manipulated, or stored by the processor 122. Although FIG. 1 illustrates processor 122 and memory 124 as being onboard the computing device 120, it is understood that the processor 122 and memory 124 may respectively comprise one or more processors and/or memories that may or may not be stored in the same physical housing. In one example, computer 120 may be a server that communicates with a networking component 160, such as a wired/wireless router or a switch, directly or indirectly, via a wired or wireless link. The computing device 120 can also connect, directly or indirectly, to one or more light sensors 110 and/or one or more image generators 130-134, as will be explained in greater detail below.

One or more light sensor(s) 110 is/are positioned to sense light (or absence of light) from the projection surface 150. The one or more lights sensor(s) 110 may be an imaging device, such as an image sensor, e.g., camera. The camera may be any type of camera, such as a digital camera (e.g., digital SLR) including self-contained optics. In other examples, the camera may have several components, such as lenses, other optics, and processing circuitry that may or may not be housed within a single housing. In one particular example, the camera is pre-calibrated to determine camera extrinsic and extrinsic parameters prior to performing the techniques set forth below.

While two light sensor(s) 110 are depicted, the system 100 can employ any number of sensors (e.g., cameras) according to various aspects of the disclosure. In one particular example, the system 100 can employ a 1:1 ratio of sensors 110 to display units 140-142. In another example, the light sensor 110 can comprise a single camera corresponding to any number of display units 140-144. The sensor 110 can transmit one or more data signals representative of the sensed light data to the computing device 120 for processing.

The projection surface 150 can be any type of two-dimensional or three-dimensional projection surface. In the example of FIG. 1, the projection surface 150 includes a 3D projection surface, such as a castle. In other examples, the projection surface can include an arrangement of individual display screens arranged adjacent to one another such that the display units 140-144 project overlap regions between adjacent display screens. In other examples, the projection surface 150 can be any complex three-dimensional shape.

The system 100 can include one or more display units 140, 142, 144. In this example, the display units 140-144 are projectors configured to project light (e.g., a light pattern) onto all or a portion of the projection surface 150. Image data to be projected by the display units 140-144 and onto the projection surface 150 can be generated at respective image generators 130, 132, 134. The image data can be transmitted from the respective image generators 130-134 to a respective display unit 140-144, where the image data can be projected onto the display surface 150 as a pattern or image.

While three display units 140-144 and three image generators 130-134 are depicted, any number or combination of display units and/or generators are contemplated. For example, a single image generator can provide image data to any number of display units.

In general, a projection mapping procedure for mapping image data onto a complex 3D projection surface can include projecting one or more images or patterns onto the projection surface 150 via display units 140-144. The projected images can be sensed by the one or more sensor(s) 110, and one or more data signals representative of the sensed light are transmitted to the computing device 120. The computing device 120 can optionally perform one or more procedures based upon the light sensor data, and can transmit one or more data signals to the image generators based upon the light sensor data and/or the calibration procedures. The image generators 130-134 can transmit image data to the display units 140-144, and the display units 140-144 can project light (e.g., a light pattern) onto the projection surface 150.

In addition to projection mapping, additional calibration procedures such as a warp, a blend, or any other type of calibration procedure can be performed. In one example, the warp can be computer at the computing device 120 (e.g., on a graphics card and/or associated graphics card software), while in other examples the warp can be computed at the image generator(s) 130-134 or at a dedicated warp module (not depicted).

II. Projection Mapping

Figure 2:
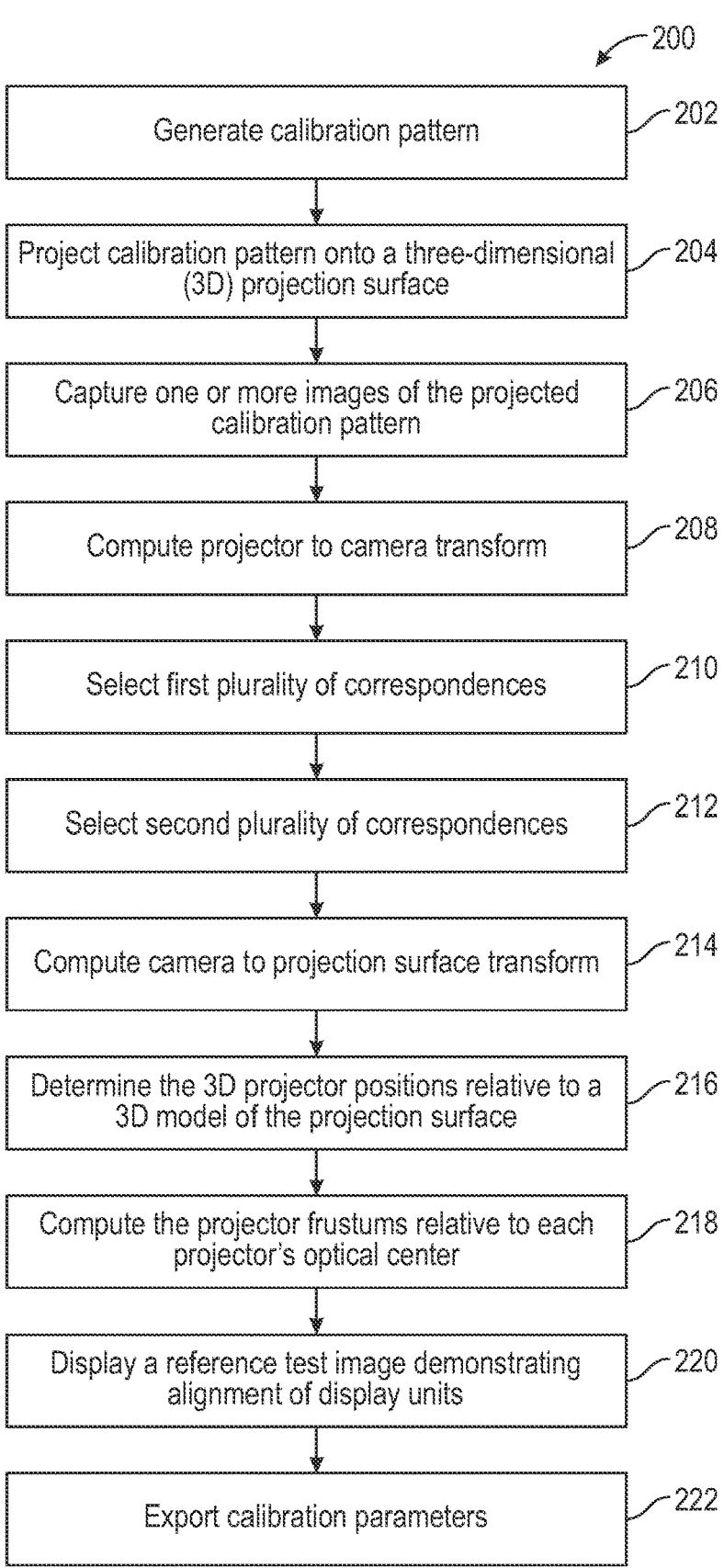
FIG. 2 is a flow chart depicting a method of projecting mapping according to one or more aspects of the present disclosure.

FIG. 2 depicts a method of projection mapping according to one or more aspects of the disclosure.

At block 202, a calibration pattern is generated.

In one example, the calibration pattern can be a structured light pattern, and in particular a two-dimensional (2D) binary gray code sequence. In one particular example, the calibration pattern is a modulated gray code sequence, as will be explained in greater detail below.

Figure 3A:
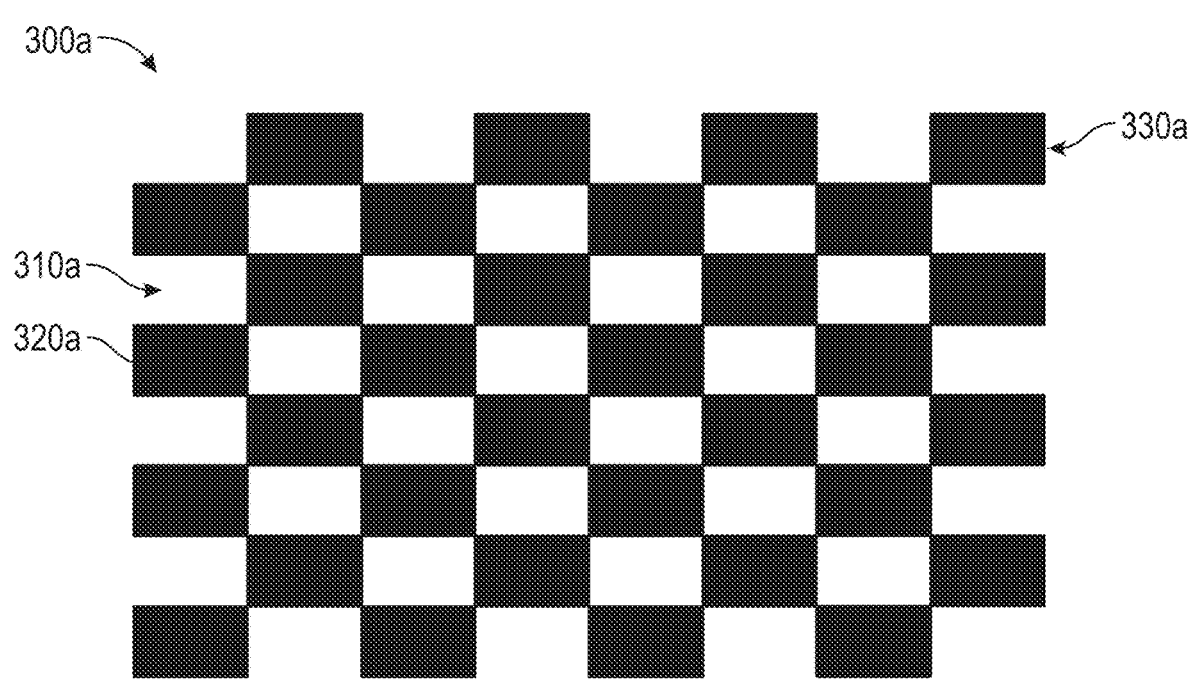
FIGS. 3A-B depict first and second patterns.

The individual pattern images that form the calibration pattern, e.g., the modulated gray code sequence, can be generated as follows:

With reference to FIG. 3A, a first pattern 300a is generated. This pattern 300a is depicted in FIG. 3A as an 8×8 cell checkerboard pattern having an alternating arrangement of first cells 310a and second cells 320a. In this example, the first cells are white and the second cells are black for maximum contrast difference, but other color parameters can be implemented based upon the particular example. The first cells 310a can be encoded as a "0" while the second cells can be encoded as a "1." For example, a top row 330a can be encoded as [01010101]. As explained below, this first pattern 300a will be used as an underlying modulating pattern.

Each of the cells 310a, 320a, can be assigned a unique number (e.g., 0-63). While the pattern 300a is depicted as 8×8 in FIG. 3A, any N×N arrangement contemplated depending on the particular implementation. For example, depending on the surface detail of the projection surface, larger or smaller cell sizes may be desirable. As N increases, the cell sizes decrease and vice versa. In some examples, it is desirable that the size of the cells are smaller than larger scale surface effects associated with the projection surface. In particular, as N increases, the effect of indirect (ambient) illumination is decreased. On the other hand, if the size of cells is too small, such as a smaller than a pixel, detection (e.g., by a sensor) can become less reliable.

Figure 3B:
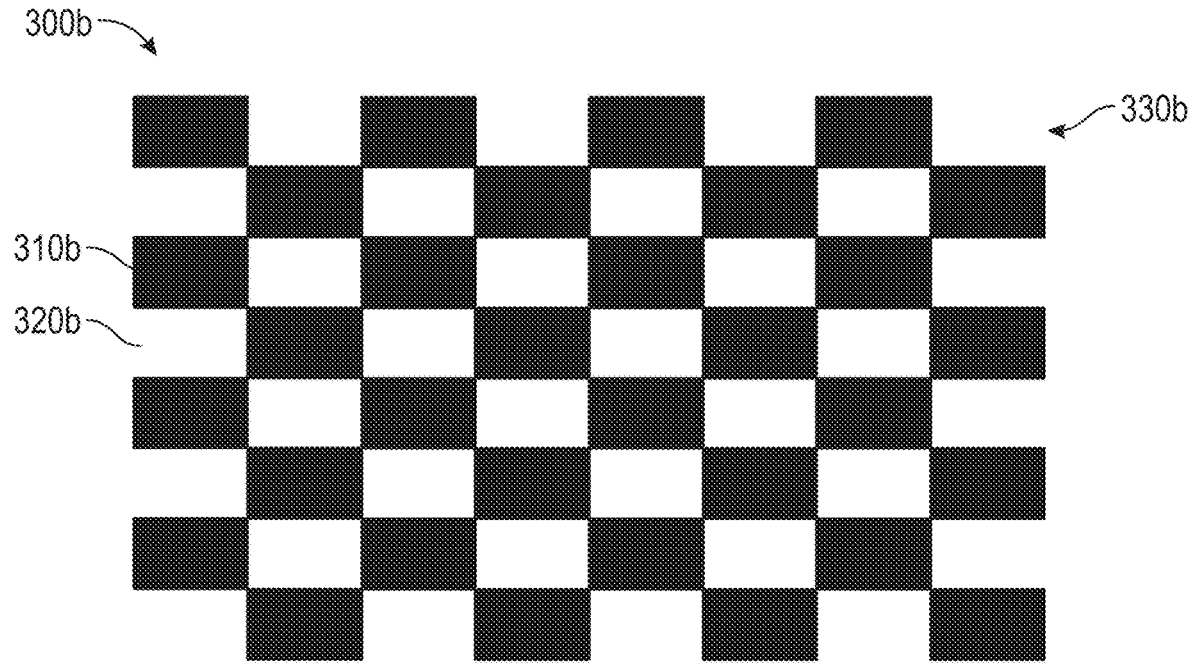

A second pattern 300b is also generated. This pattern 300b is depicted in FIG. 3B as an 8×8 checkerboard pattern having an alternating arrangement of first cells 310b and second cells 320b. In this example, the first cells are black and the second cells are white, but other color parameters can be implemented based upon the particular example. The second pattern 300b is the binary complement of the first pattern 300A insofar as each of the first cells 310b are the binary complement (e.g., opposite) of the first cells 310a and the second cells 320b are the binary complement of the second cells 310b. For example, a top row 330a can be encoded as [10101010].

Figures 4A, 4B, 4C, 4D, 4E, 4F, 4G, 4H:
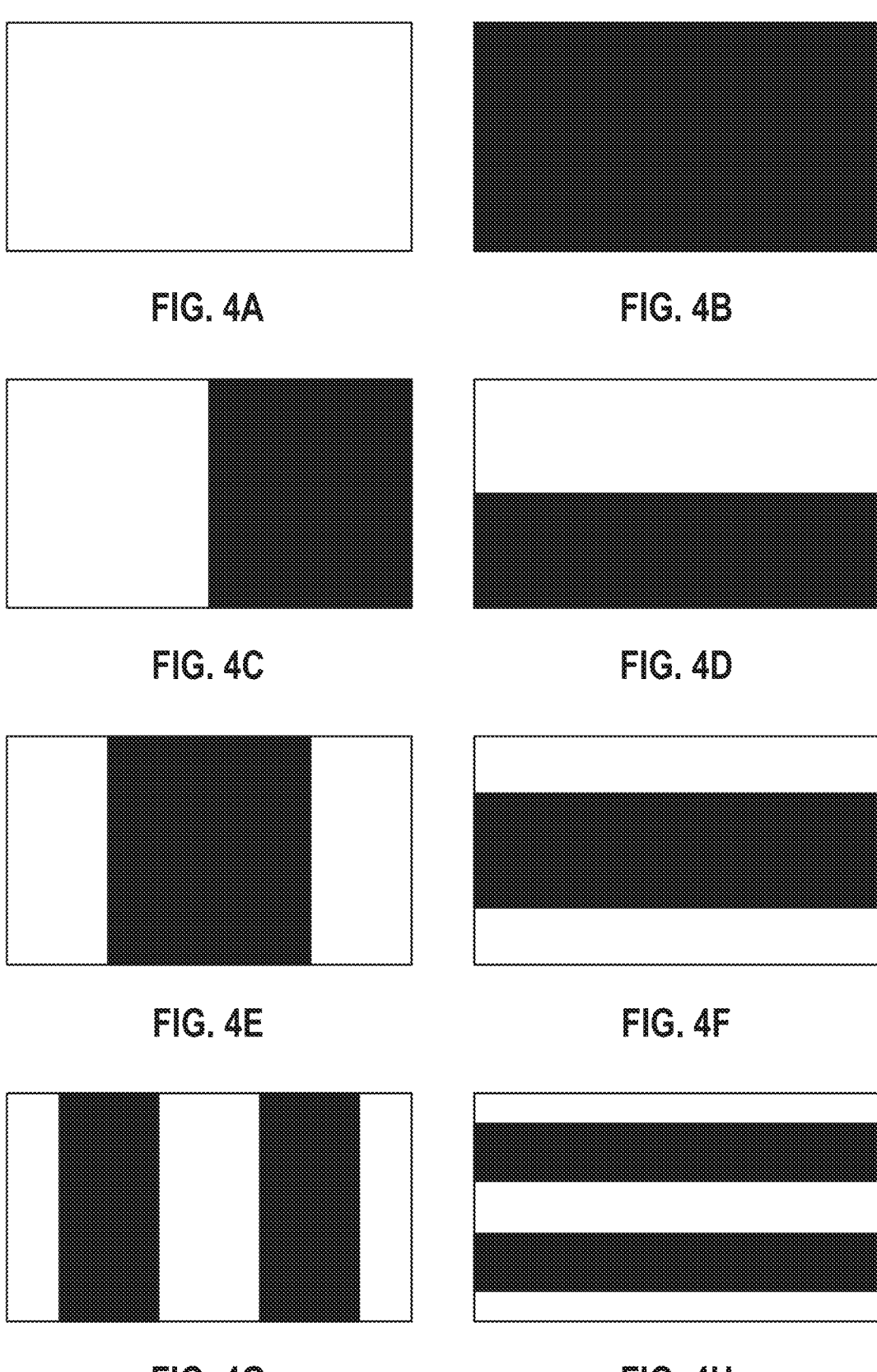
FIGS. 4A-P depict a two-dimensional gray code sequence
Figures 4I, 4J, 4K, 4L, 4M, 4N, 4O, 4P:
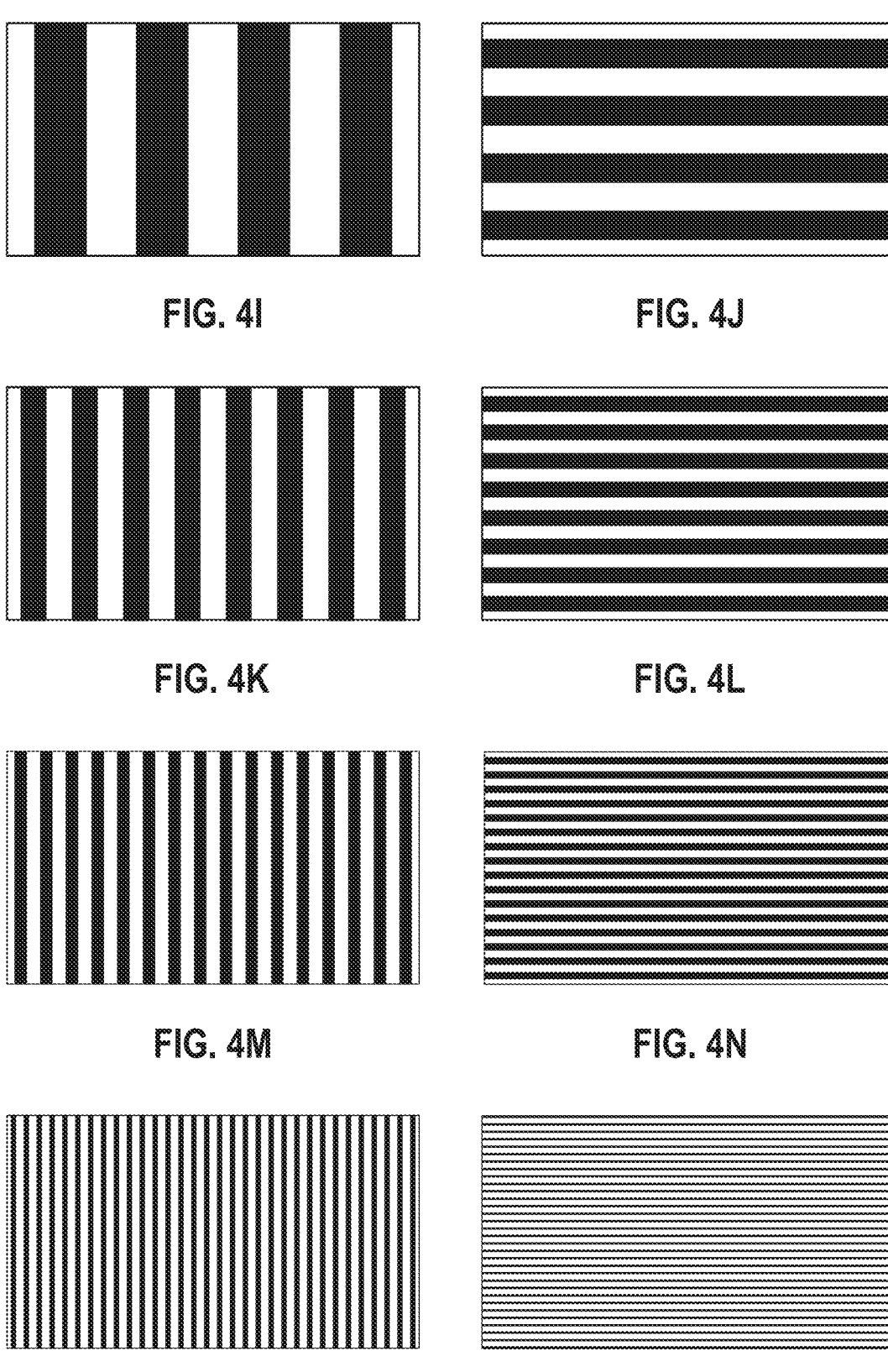
Figures 5I, 5J, 5K, 5L, 5M, 5N, 5O, 5P:
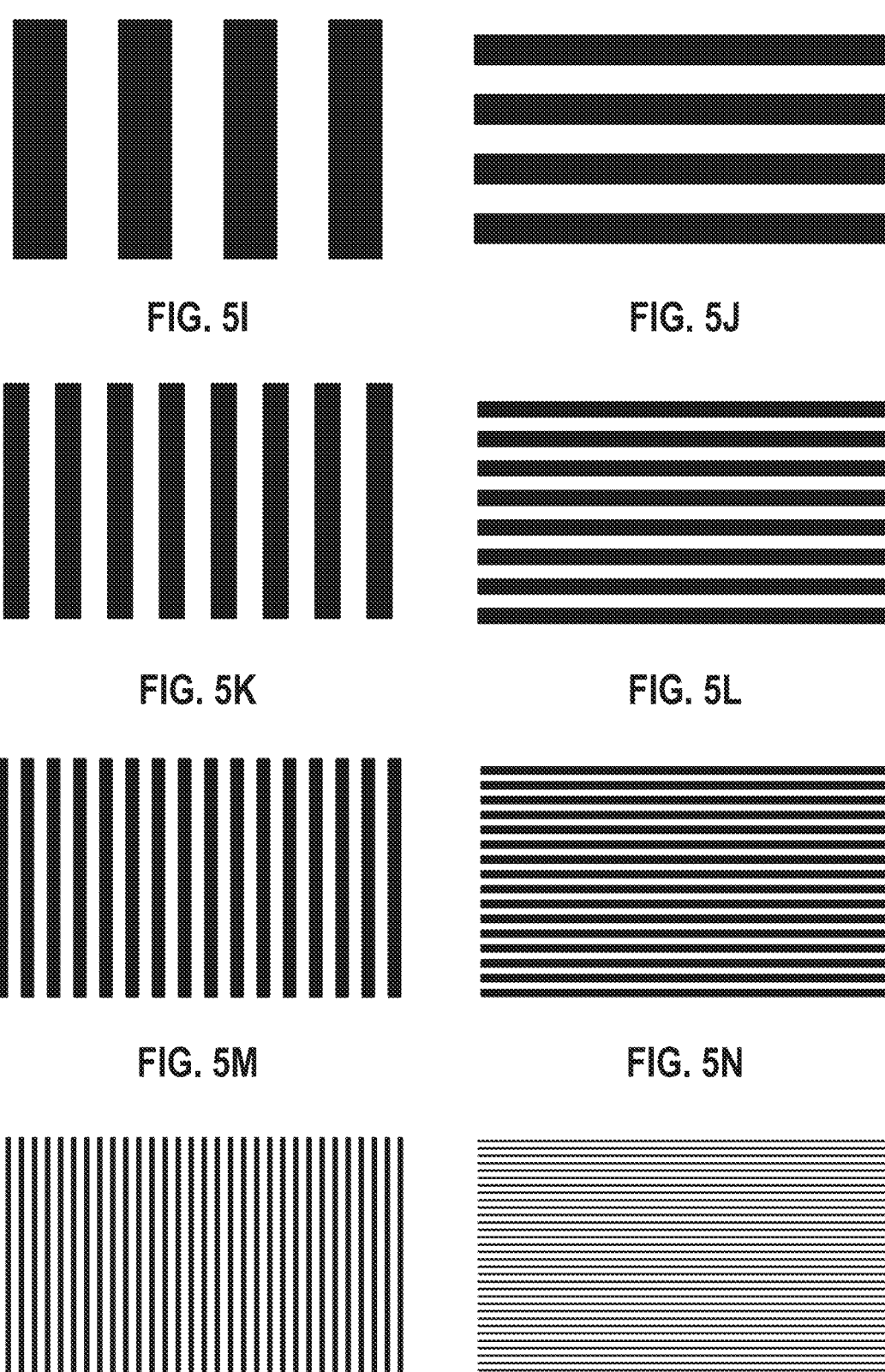

A predetermined gray code sequence is modulated by the first pattern 300a to generate a modulated gray code sequence. An exemplary predetermined gray code sequence is depicted at FIGS. 4A-P. It is contemplated that other gray code sequences can be implemented in accordance with aspects of the present disclosure. Each of the patterns of the gray code sequence of FIGS. 4A-P are modulated with the first pattern 300a to arrive at a modulated gray code sequence, which is depicted at FIGS. 5A-P. In particular, the pattern of FIG. 4A is modulated with the pattern 300a to arrive at the modulated pattern of FIG. 5A, and so on for FIGS. 4B-P and FIGS. 5B-P.

The modulated gray code sequence patterns are determined based upon the corresponding cells of the pattern 300a and the predetermined gray code sequence (e.g., 4A-P) where each image in the modulated gray code sequence corresponds to one bit of the binary bit sequence used to uniquely identify each cell. For example, if a cell contains a '0' in its modulated gray code sequence for the bit corresponding to the current image, then the cell from the pattern 300a will remain unchanged. If a cell contains a '1' in its modulated gray code sequence for the bit corresponding to the current image, then the cell from the pattern 300*a* will be chosen to be the same as the pattern 300*b*. In this manner, rather than encoding white or black as a '0' or '1' in the gray code pattern, the pattern is encoding whether there is a change or no change compared to first pattern 300*a*.

As shown beginning with FIGS. 4G-4P, an increasingly dense sequence of line patterns can be used to achieve a denser pattern. These line patterns are not modulated by the first pattern 300*a* since their structure is already fine (e.g., dense) so as to prevent significant changes in indirect illumination between pattern images.

In one example, the number of patterns in the sequences are selected based upon the number of cells in the first pattern 300*a*. For example, the 8×8 pattern includes 64 unique cells (e.g., numbered 0-63). A number of bits (e.g., sequentially projected cells) is selected to uniquely identify each cell.

At block 204, the modulated gray code pattern is sequentially projected onto a three-dimensional (3D) projection surface (e.g., 150). This can be done by a first of display units 140-144, and in one example the display units are projectors.

At block 206, images of the projected calibration patterns are captured by one or more image sensors. This can be done by the one or more sensors 110, and in one example the sensors are cameras. The captured images can be transmitted (wired or wirelessly) to processor 120 for processing. In another example, processing of the images can occur onboard the camera(s) themselves.

At block 208, a projector to camera mapping is determined for each projector/camera pair. This mapping is set forth as a set of pixel to pixel correspondences, e.g., a correspondence from camera pixels to projector pixels such that corresponding camera and projector pixels are coincident on the same location of the projection surface.

Here, for each pattern, a determination is made regarding which cells were displayed to be the same as the first pattern and which cells were displayed to be the opposite.

The patterns of FIGS. 5A and 5B are first displayed to determine a threshold for what constitutes a "1" cell or a "0" cell. Under ideal conditions, a contrast difference between the opposite cell would be a maximum contrast difference between black and white. In certain conditions (e.g., ambient illumination, indirect illumination etc.), the contrast difference between opposite bits is less than an idealized maximum. In this regard, a threshold is established regarding when a bit constitutes a "1" or a "0."

For the patterns of FIG. 5C and beyond, each pixel is classified according to whether the pixel intensity value is the same or different as the first sequence pattern of FIG. 5A. Based upon this, a gray code bit sequence is reconstructed at each camera pixel and used to classify the camera pixels to particular cells in the projector. Once classified, camera pixels belonging to the same projector cell are used to compute the centroid (e.g., central point) of the cell (to a pixel or subpixel value) in the camera. Since the original cell center (as a pixel location of the projector) is known by construction, this establishes a pixel-to-pixel image correspondence between calibration cameras and calibration projectors for all detected cells.

Notably, the pattern of 5C (for example) defines a similar overall, total area of light versus dark features, but uses a gray code calibration projection process that causes the average intensity of the projected (and acquired) sequence of gray code images to be more uniformly presented across the overall acquired (by the camera(s)) image field. This contrasts to the conventional gray code sequence calibration process image of FIG. 4C, in which there are large concentrations or either light or dark feature in various regions of the image. Hence, the sequence contemplated herein is more resistant to effects of indirect lighting. As shown, the first few patterns (e.g. up until the fifth or sixth—also termed the "initial patterns") in the overall gray code sequence of FIG. 5A-5P, thus, provides a more uniform average intensity over the image field by distributing the light and dark features more evenly across that field than the same images in the sequence of FIGS. 4A-4P. This more-even distribution effectively encodes the same, standard light and dark information of FIGS. 4A-4P, but does so in a manner that is less sensitive to local variations in external illumination that may exist in the ambient environment. That incident light may fall upon the projection surface in a manner that would disrupt the light and dark information provided by the initial patterns of FIGS. 4A-4P more acutely than those of the more distributed initial patterns of FIGS. 5A-5P. Note, as used herein, the term "indirect light" can be considered light that is generate by the projector's own illumination onto the projection surface, and more particularly, light that strikes an adjacent surface that may, thus, create an unintended lighting effect on otherwise dark features. This tends to give a false impression of light or dark on an adjacent surface pattern, thus causing inaccuracy in the projector calibration process. By way of a useful example, if the pattern of FIG. 4C were projected into a corner, with one black wall and adjoining white wall, any indirect light would alter the pattern one of the wall images. Modulation of the pattern according to FIGS. 5A-5P serves to minimize this effect. In this sense, the initial patterns of FIG. 5A-5P present a more uniformly overall gray distribution throughout a projected sequence than the initial patterns of FIG. 4A-4P. Thus, as used herein, the overall term "maintaining a substantially consistent average intensity across a field of the image in each pattern in the sequence", and equivalents thereof, shall refer to the properties of the pattern in FIGS. 5A-5P. According to an exemplary, non-limiting embodiment, the first patterns (FIGS. 5A and 5B) of the overall set of initial patterns (e.g. FIGS. 5A-5G) are presented as regular tessellations (e.g. checkerboards) that alternate positions of their light and dark features, respectively. The next patterns (FIGS. 5C-5F) provide one or more rows of either horizontally (FIGS. 5C and 5E) or vertically (FIGS. 5D and 5F) doubled features in respective columns or rows within the surrounding tessellation from the first pattern(s). More particularly, the patterns of FIGS. 4C and 4D are modulated by the patterns of FIGS. 5A and 5B, while FIGS. 5C and 5D respectively provide a pattern that provides a bifurcated mirror image pattern on each side of each of a vertical and horizontal, bifurcating center line in the projection field. Additionally, patterns 5E and 5F (and potentially other subsequent patterns in the sequence) can be characterized as a version of mirror images taken along respective horizontal and vertical bifurcating center lines.

As described herein, a further conceptualization of the substantially consistent nature of initial patterns in the gray code sequence can be derived by comparing (e.g.) the conventional pattern of FIG. 4C relative to the more-tessellated pattern of the embodiment in FIG. 5C. In bisecting the left and right halves of FIG. 4C evenly with a vertical line, the viewer is presented with a sharp discontinuity between light and dark features in both bisected halves of the image. Any local variation in indirect light on the projection surface could have a pronounced effect on one or more of these large features. Conversely, bisecting the same image field in FIG.

5C results in a smaller effect for a localized indirect light variation. Notably, the total area of light versus dark features is the same in both images (FIGS. 4C and 5C), thus, providing the needed calibration information for a standard calibration technique (i.e. determination of projector frusta) for a plurality of projectors. More generally, the modulated gray code sequence herein desirably maintains contrast when decoding the projected pattern sequence.

Figure 6A:
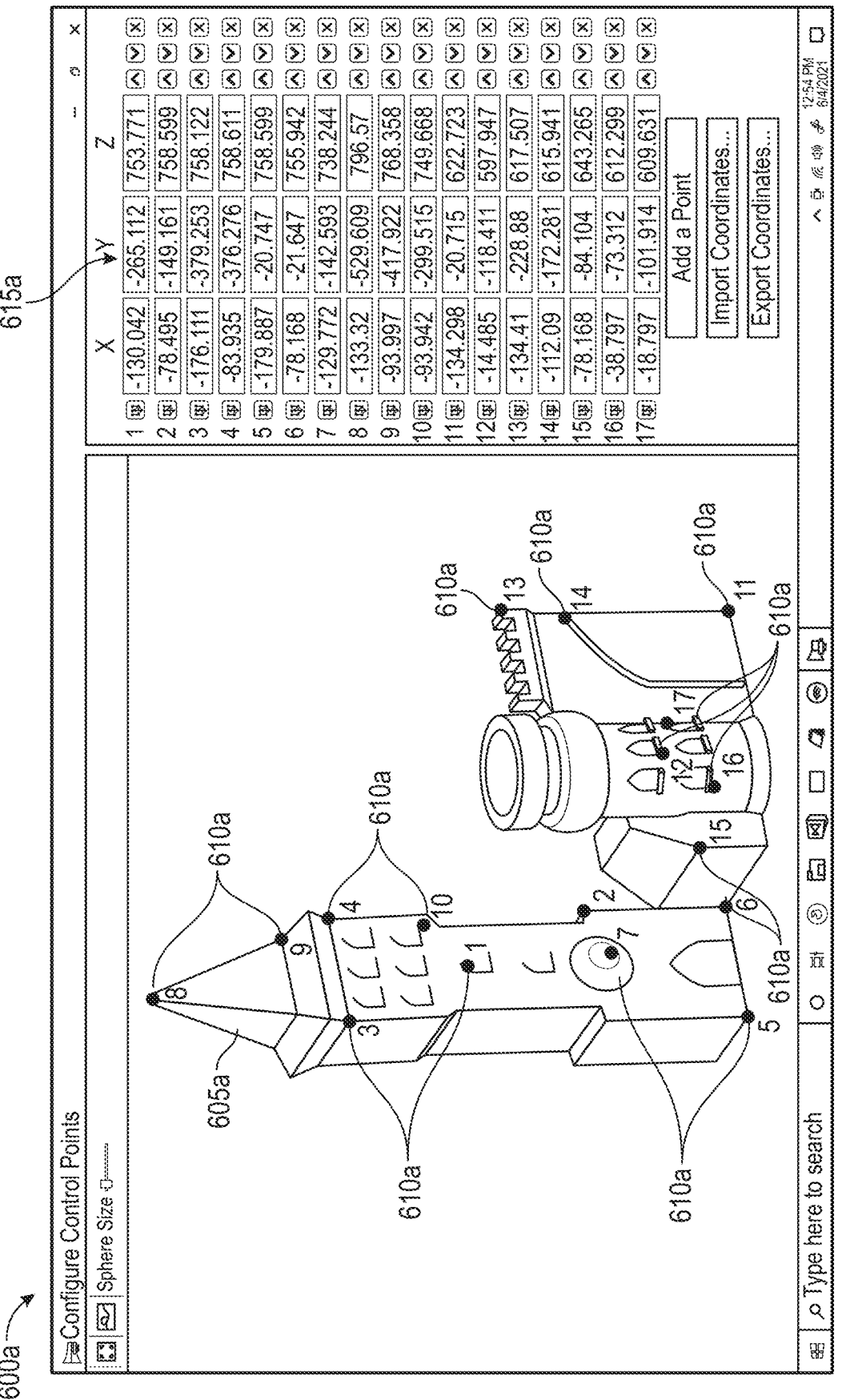
FIGS. 6A-B depict a graphic user interface showing selection of correspondences.

At block 210, and with reference to FIG. 6A, a first plurality of correspondences 610a are selected on a model 605a of the 3D projection surface. FIG. 6A depicts a graphic user interface (GUI) 600a depicting a model of the 3D projection surface. Using a mouse or other input, a user can select one or more correspondences 610a on the model. Also displayed on the GUI 600a are 3D coordinates (x,y,z) in the model coordinate space corresponding to the selected correspondences 610a.

As described above, the first plurality of correspondences 610a can be user-identified as points on the model of the 3D projection surface itself, or the correspondences can be fiducials. The number of correspondences can vary depending on the particular implementation and the particular projection surface, and in one example, can be at least three per camera or projector.

Figure 6B:
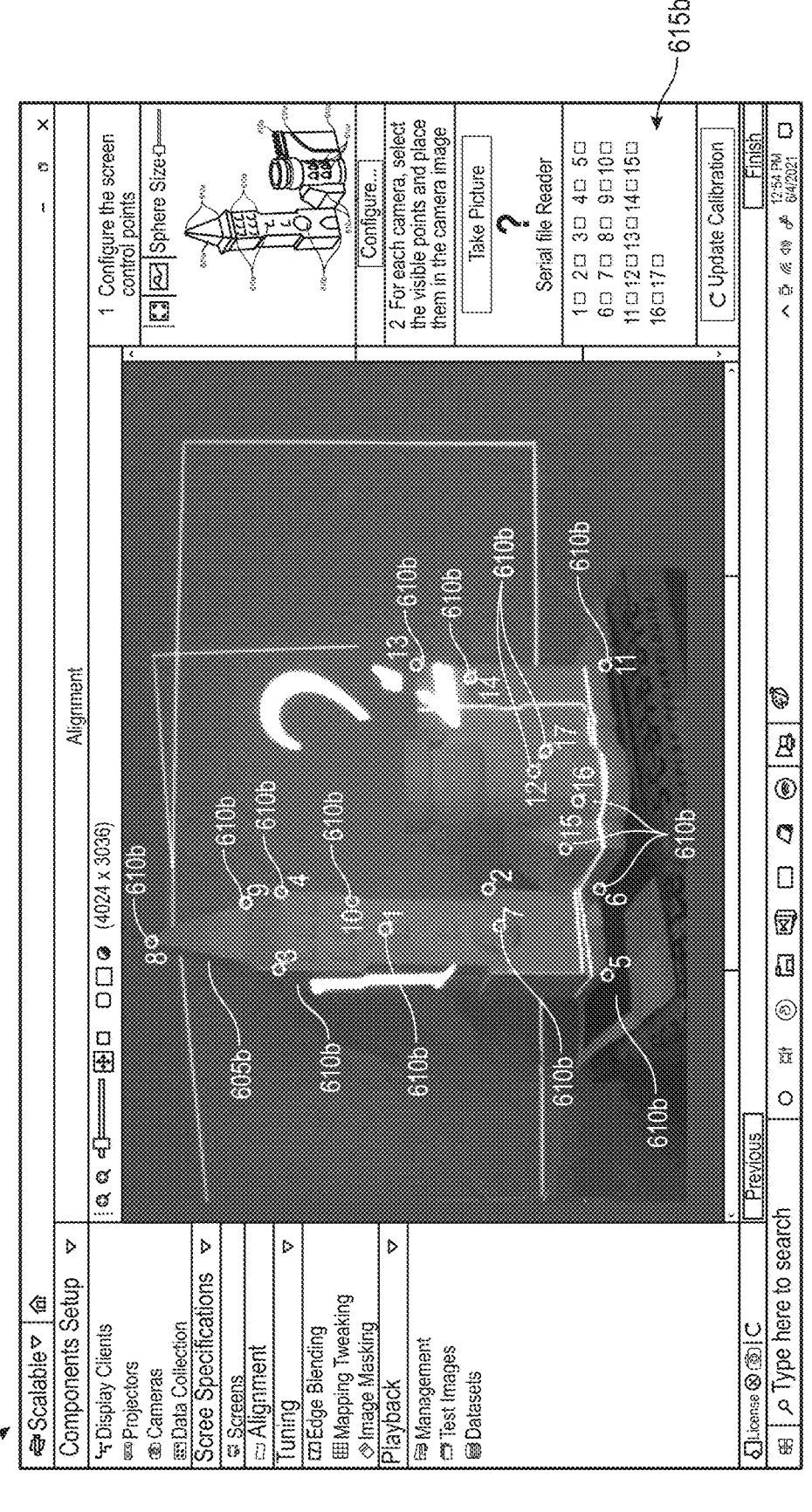

At block 212, and with reference to FIG. 6B, a second plurality of correspondences 610b are selected on the imaged and displayed 3D projection surface 605b. FIG. 6B depicts a graphic user interface (GUI) 600b depicting the imaged and displayed 3D projection surface 605b. Using a mouse or other input, a user can select one or more correspondences 610b on the displayed 3D projection surface 605b that correspond (e.g., overlap) with the selected first plurality of correspondences 610a of the model.

As described above, the second plurality of correspondences 610b can be user-identified as points on the imaged and displayed 3D projection surface, or the correspondences can be fiducials. The number of correspondences can vary depending on the particular implementation and the particular projection surface, and in one example, can be at least three per camera or projector.

Also depicted is a module 615b for enabling or disabling certain correspondences. For example, since different cameras have different fields of view (FOV), certain correspondences may not be visible (e.g., capable of being imaged) by a particular camera. In this regard, those correspondences not visible can be disabled by toggling the particular correspondence in the module 615b. For correspondences that are visible across multiple cameras, those correspondences can be reused.

At block 214, a camera to projection surface transform is generated based upon the correspondences selected at blocks 210-212. The camera to projection surface transform represents a mapping between camera pixels to 3D locations in the projection surface coordinate space.

This can be performed by using the set of 3D and 2D correspondences from blocks 210-212 and solving as a system of linear questions, e.g., a direct linear transform (DLT). This initial solution is used as an initial estimate for a non-linear optimization to determine each camera's frustum, including FOV parameters. Note that other computation techniques for providing correspondence results similar or identical to those described herein can be employed in a manner clear to those of ordinary skill. Thus, the term "transform" and/or "transformation" should be taken broadly to include a variety of techniques for determining/generating such results.

At block 216, the projector-to-camera correspondences and camera-to-screen transform are used to determine each projector's frustum, including FOV parameters and optional lens distortion parameters relative to a 3D model of the projection surface (stored in memory). This is performed by projecting the projection surface geometry into the camera image and, for each pixel location, assigning a 3D location of the projection surface to a camera pixel. This information is then combined with the projector-camera image correspondences. At every camera pixel where a projector pixel correspondence was measured as the result of pattern detection, the 3D location of the screen surface at that camera pixel is assigned to the corresponding projector pixel. This determines a list of correspondence between projector pixels and known 3D points on the projection surface corresponding to that particular pixel.

At block 218, for each projector, compute the projector frustums relative to the projection surface. This is generated as a projection matrix or frustum that maps 3D locations on the 3D projection surface to 2D projector pixels. In some examples, outlier filtering is employed to filter off-object points. Such filtering can be RANSAC filtering. This can be performed by a DLT, in which an initial solution is used as an initial estimate for a non-linear optimization to determine each projector's frustum, including FOV parameters. Each frustum can also include distortion parameters for each projector, such as lens distortion parameters.

Figure 13:
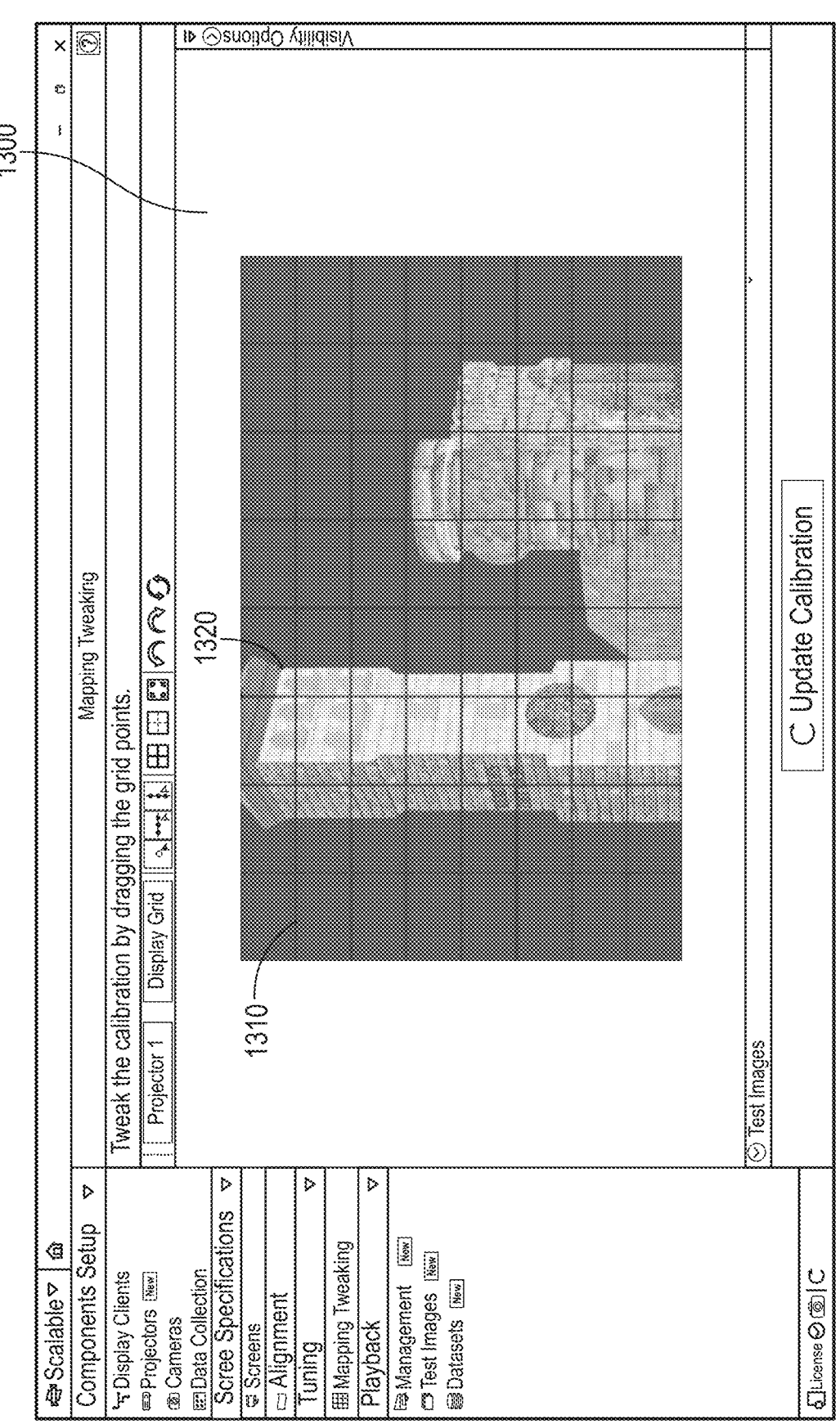
FIG. 13 depicts an adjustment tool that allows the mapping of projector pixels onto the screen surface to be manually adjusted.

Optionally, the computed mapping of projector pixels to projection surface at block 218 can be manually adjusted or refined (e.g., tweaked) by a user. FIG. 13 depicts a graphical user interface (GUI) 1300 displaying a grid-based adjustment (e.g., refinement or tweaking) tool that allows the mapping of projector pixels onto the screen surface to be manually adjusted to account for any errors in the computed projector frusta and associated parameters. In this example, a grid 1310 is overlaid atop the model of the projection surface 1320. A user may adjust or refine the calibration by clicking and dragging any of the grid points to adjust the alignment of the grid 1310 and the model of the projection surface 1320.

For example, there may be some areas of the display where the projected image content does not properly align to the physical projection object or, in a blend zone, the pixels from multiple projectors might be slightly misaligned to one another. In these cases, a grid 1310 is provided for each projector where each grid intersection can be shifted within the two dimensions of the projector image space to drag the projected image content into the correctly aligned position on the physical projection object or into alignment with the projected images of other overlapping projectors.

At block 220, a reference test image can optionally be displayed to demonstrate the alignment of the calibrated projectors.

At block 222, the calibration parameters and associated manual adjustment/refinement corrections can optionally be exported, for example, in a proprietary OL file format, for use by third party media servers that are integrated with a proprietary software development kit.

In some examples, after calibration, subsequent recalibrations can be performed. This can be done where the projectors and cameras have shifted slightly from their original positions that instead of requiring the user to update the locations of the control points in the camera images (e.g., at block 212), the camera and projector positions are updated via a refinement or optimization process based on a new pattern projection and detection result (camera to projector correspondences establishing the camera to projector transform). This optimization process uses the prior calibrated projector and camera frusta as an initial solution for the current camera and projector frustum values. Then, using the prior known 3D geometry of the projection surface as well as the current camera to projector correspondences, the camera and projector frusta values are updated via a non-linear refinement process that minimizes the reprojection error of the current camera to projector correspondences. For example, given a point location in the camera, the projection surface can be projected into that camera using its current frustum values to yield a 3D location on the projection surface for that location in the camera. This 3D location can be projected into a projector using its current frustum value to yield a 2D pixel location in the projector. A reprojection error can then be computed by comparing this pixel location with that measured by the result of pattern detection. The camera and projector frusta can then be refined to reduce this reprojection using a non-linear optimization technique such as sparse Levenberg-Marquardt.

III. Blend Map

Figure 7:
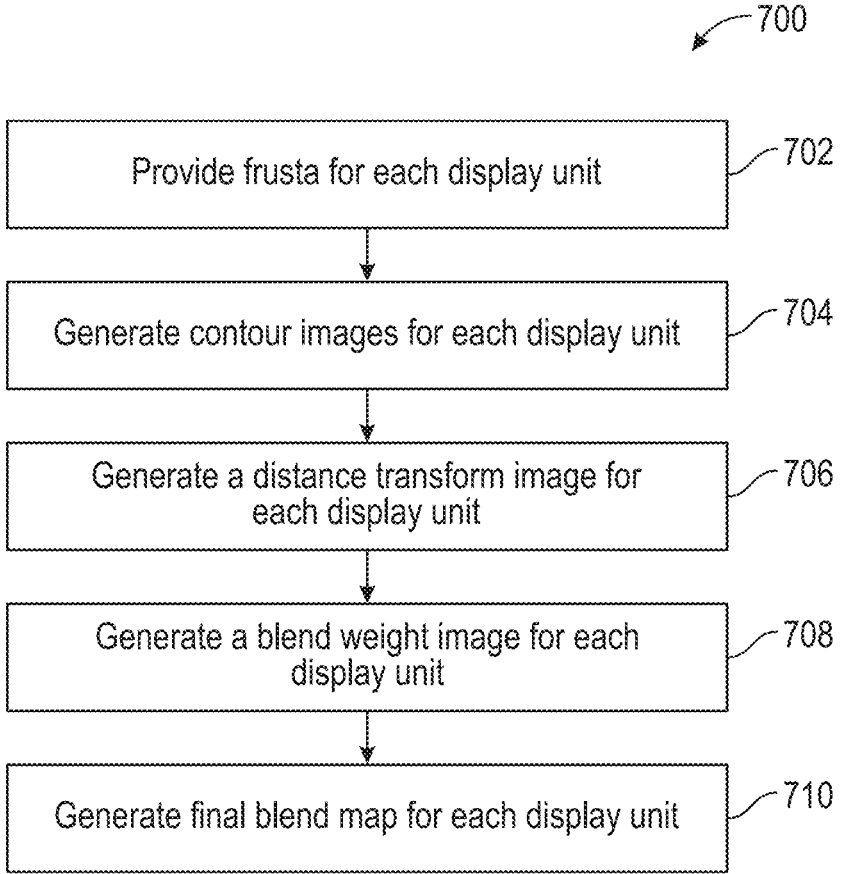
FIG. 7 is a flow chart depicting a method of generating blend maps.

FIG. 7 is a method of computing a blend map according to one or more aspects of the disclosure.

At block 702, the known projector frustum are provided. This can be calculated from, for example, the projection mapping method of FIG. 2

Figure 8A:
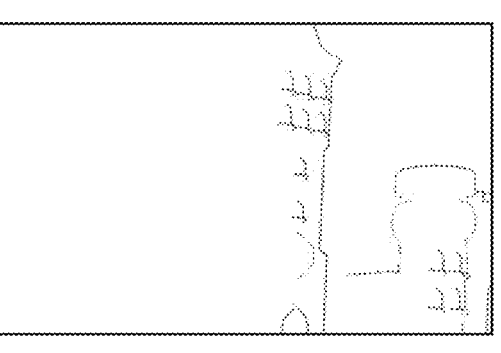
FIGS. 8A-B depict contour images generated during generation of blend maps.
Figure 8B:
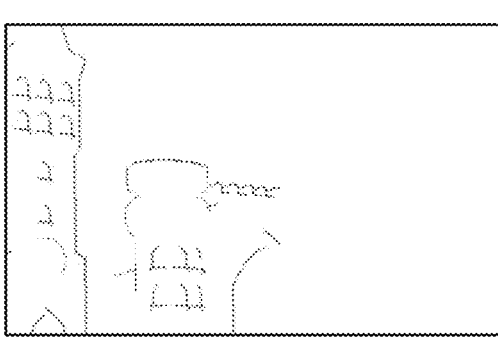

At block 704, contour images are generated for each projector. This is depicted in FIGS. 8A-B, where FIG. 8A represents a contour image for a first projector and FIG. 8B represents a contour images for a second projector.

In doing so, a scene is imaged once per each projector. Then, the scene is drawn in wireframe mode into the projector image (all triangles are drawn with only their edges as black lines). This is done with slightly increased line thickness to artificially increase the width of the triangle edges. Next, the scene is drawn again with all triangles filled with a background color. This second render pass is performed over the top of the scene drawn in wireframe mode. The result will leave behind any contours outlined in black from step the previous render pass where there is a sudden change in scene depth that indicates the beginning of a shadow region in the current projector.

Figure 9A:
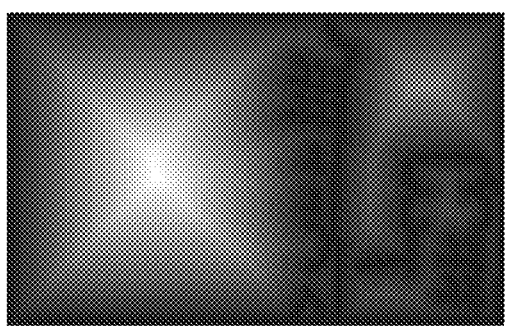
FIGS. 9A-B depict distance transform images generated during generation of blend maps.
Figure 9B:
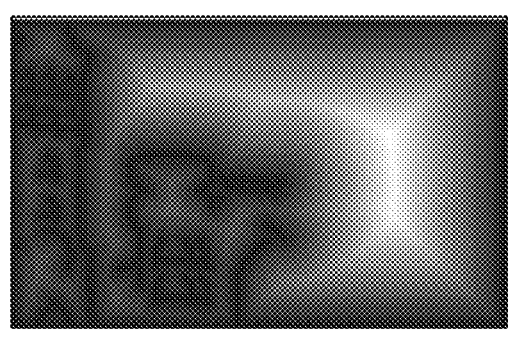

At block 706, the contour images are used to compute a distance transform image for each projector. This is depicted at FIGS. 9A-B, with FIG. 9A representing a distance transform image of the contour image of FIG. 8A, and the distance transform image of FIG. 9B representing a distance transform image of the contour image of FIG. 8B. The distance transform image represents a weight image where the weight increases the further each pixel is from the nearest contour line. Black pixels are areas where that projector cannot project.

At block 708, a blend weight image is generated for each projector. The blend weight image can be generated based upon one or more of a plurality of factors.

One factor is a spatially varying weight function that is large in the projector center and fades smoothly to the projector edge. This is designed to reduce each projector's blending contribution as it nears its image boundary.

Figure 10A:
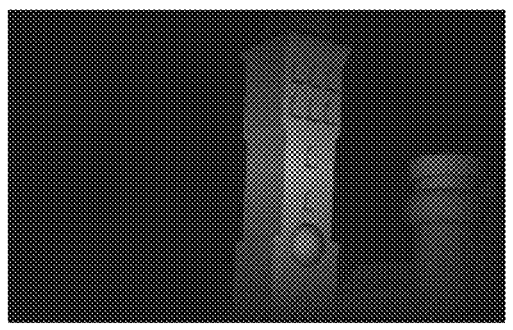
FIGS. 10A-B depict angle-of-incidence images generated during generation of blend maps.
Figure 10B:
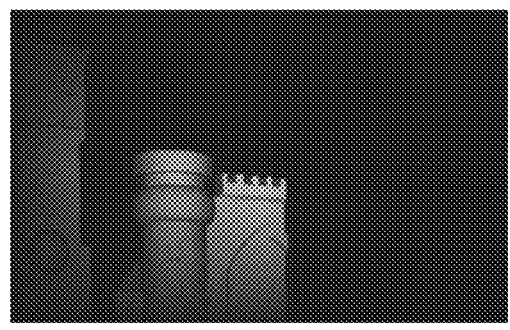

At each projector another factor, depicted at FIGS. 10A-B, is determined by the angle of incidence to the screen pixel (i.e. if the projector has a very shear angle to the surface at a pixel the weight is reduced compared to a surface seen head-on).

Another factor is the distance transform image for each projector. All factors are multiplicatively combined to create a final blend weight at all pixels of each projector.

Figures 11A, 11B, 12A, 12B:
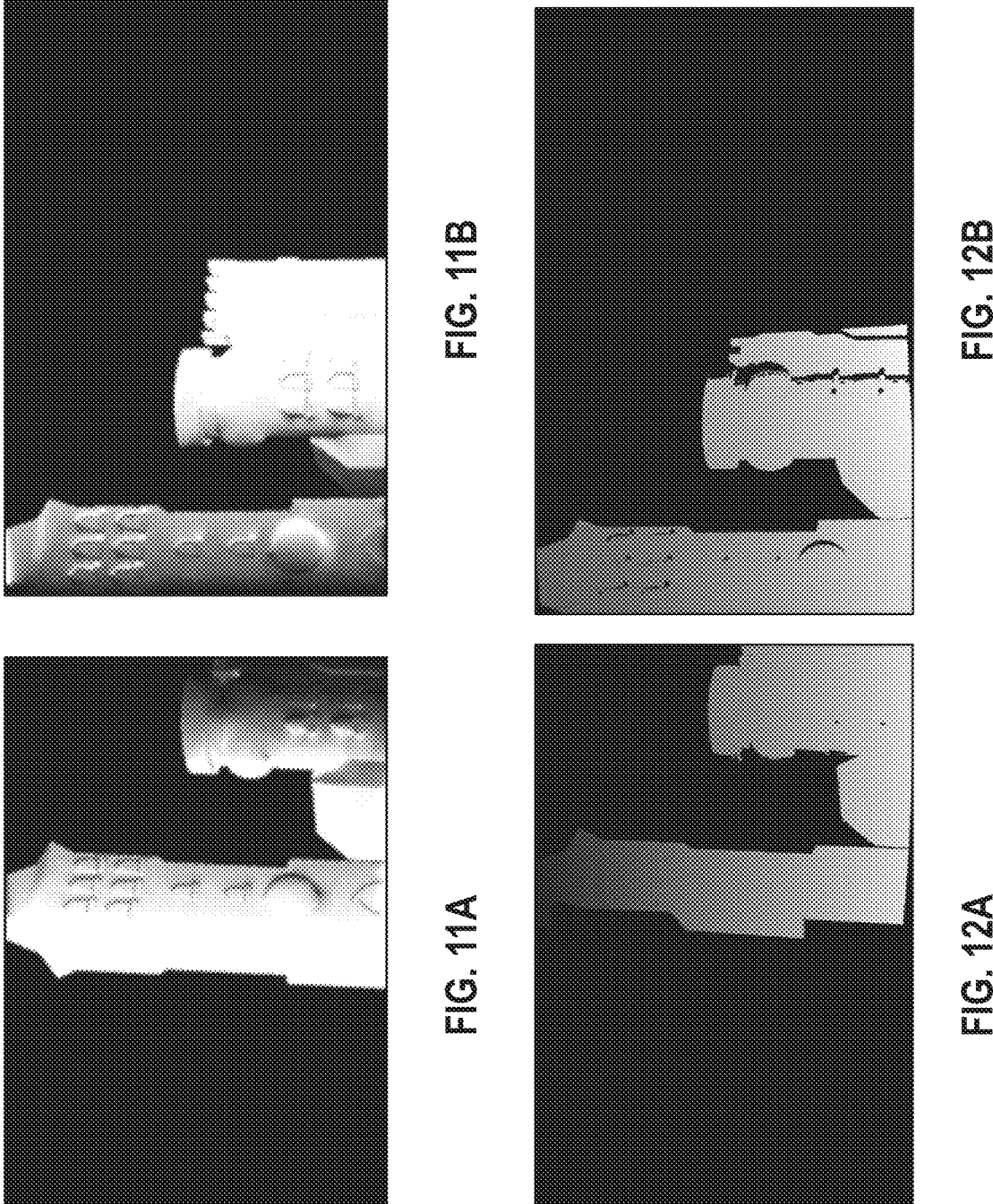
FIGS. 11A-B depict final blend maps.
FIGS. 12A-B depict correspondence images.

At block 710, the final blend map is generated for each projector using the inputs above. This is depicted as FIG. 11A-B, with 11A corresponding to the first projector and 11B corresponding to the second projector. To generate the final blend map, for each projector, first generate a correspondence image to the other projectors. This is depicted at FIGS. 12A-B. This is created using a process similar to that used in graphics engines to generate shadows. Draw the scene into Projector A where the color of each scene vertex is the location that the vertex maps to in Projector B, correctly taking into account occlusions. This resulting correspondence image acts as a lookup table that can be used to determine the pixel locations in other projectors that are coincident on the screen with any given pixel in the current projector.

Next, correspondence maps are used to determine total blending weights from all projectors at each pixel. Then, for each projector, at each pixel, use the correspondence map to lookup the corresponding pixel location in overlapping projectors. The pixel locations in the overlapping projectors are used to lookup their corresponding blend weights at that point on the projector surface. The blend weights from all projectors (including the current projector) are then summed to determine the total blending weight from all overlapping projectors at this location. The final blend weight is computed by dividing each projector's weight by the computed total in order to normalize the result such that all projector blend weights sum to 1.0. Once the final blend weight images are computed for all projectors, optionally a small blurring effect is applied to smooth the blends. With the final blend maps generated, one or more images or patterns may be displayed by the projectors onto the projection surface based upon the final blend maps.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method for projection mapping, for a plurality of projectors, responsive to an image processor arrangement, in which the processor arrangement receives image data from projected images of each projector of the plurality of projectors, the method comprising:

projecting a sequential calibration pattern onto a projection surface;

capturing one or more images of the projection surface including at least one pattern of the sequential calibration pattern projected thereon;

computing a projector to camera transform;

computing a camera to projection surface transform as a mapping between camera pixels to 3D locations in a coordinate space of the projection surface based on a portion of a set of projection surface image correspondences from an image of the projection surface that correspond to one or more of a set of projection surface model correspondences from a digital model of the projection surface that is independent of the one or more captured images;

determining a projector to projection surface transform; and determining a frustum for each projector.

2. The method of claim 1, wherein the sequential calibration pattern comprises a modulated gray code sequence.

3. The method of claim 2, wherein the modulated gray code sequence is generated by modulating a predetermined gray code sequence with a first pattern.

4. The method of claim 1, wherein the one or more images are captured with at least one camera.

5. The method of claim 1, wherein the projection surface comprises a three-dimensional (3D) projection surface.

6. The method of claim 1, wherein computing the projector to camera transform comprises: for each pattern of the sequential calibration pattern, determining whether a pixel intensity of displayed cells are the same or opposite as compared to a first pattern, reconstructing a gray code bit sequence at each camera pixel, and classifying each camera pixel to particular cells in the projector.

7. The method of claim 6, further comprising, computing a centroid of each cell relative to the camera.

8. The method of claim 1, wherein computing the camera to projection surface transform comprises: selecting a first plurality of correspondences in a model of the projection surface, and selecting a second plurality of correspondences in an image of the projection surface, wherein the second plurality of correspondences correspond with the first plurality of correspondences.

9. The method of claim 1, further comprising, manually adjusting the projector to projection surface transform using a grid-based adjustment tool, so as to provide a fine tuning to the projection mapping.

10. The method of claim 1, further comprising, computing a blend map, including generating a contour image with each projector onto the surface based upon the frustum for the projector.

11. The method of claim 1, further comprising, generating a distance transform image for each projector.

12. The method of claim 11, further comprising, generating a blend weight image for each projector.

13. The method of claim 12, further comprising, generating a final blend map for each projector.

14. A system for projection mapping for a plurality of projectors, responsive to an image processor arrangement, in which the processor arrangement receiving image data with a camera from projected images of each projector of the plurality of projectors, the system comprising:

a projection process of the processing arrangement that is adapted to project a sequential calibration pattern onto a projection surface, at a predetermined image field thereof, with each projector, respectively;

the image data including one or more images, within the predetermined image field, with respect to each projector of each pattern of a plurality of patterns of the sequential calibration pattern, wherein the sequential calibration pattern comprises a modulated gray code sequence, which is generated by modulating a predetermined gray code sequence with a first pattern;

the image processor arrangement computing a camera to projection surface transform based on a portion of a set of first correspondences from an image of the projection surface that correspond to one or more of a set of second correspondences from a digital model of the projection surface that is independent of the received image data; and the predetermined gray code sequence being adapted to maintain a substantially consistent average intensity across the image field in each pattern in the sequence.

15. The system of claim 14 wherein the image processor arrangement is adapted to generate a distance transform image for each projector.

16. The system of claim 15 wherein the image processor arrangement is adapted to generate a blend weight image for each projector.

17. The system of claim 16 wherein the image processor arrangement is adapted to generate a final blend map for each projector.

18. The system of claim 14 wherein initial patterns of the gray code sequence include a first pattern that is a tessellation of light and dark features, and at least one subsequent pattern in the gray code sequence that defines a bifurcated mirror image of the first pattern on each side of each of a vertical bifurcating center line and a horizontal bifurcating center line.

19. The system of claim 14 wherein the image processor is constructed and arranged to compute a projector to camera transform.

20. The system of claim 19 wherein the image processor is constructed and arranged to determine a projector to projection surface transform and a frustum for each projector.

* * * * *